(12) United States Patent
Nygaard et al.

(10) Patent No.: US 12,073,952 B2
(45) Date of Patent: *Aug. 27, 2024

(54) FAIL-SAFE REACTIVITY COMPENSATION METHOD FOR A NUCLEAR REACTOR

(71) Applicant: BWXT Technical Services Group, Inc., Charlotte, NC (US)

(72) Inventors: Erik T. Nygaard, Lynchburg, VA (US); Peter L. Angelo, Oak Ridge, TN (US); Scott B. Aase, Aiken, SC (US)

(73) Assignee: BWXT Technical Services Group, Inc., Lynchburg, VA (US)

( * ) Notice: Subject to any disclaimer, the term of this patent is extended or adjusted under 35 U.S.C. 154(b) by 243 days.

This patent is subject to a terminal disclaimer.

(21) Appl. No.: 17/349,595

(22) Filed: Jun. 16, 2021

(65) Prior Publication Data

US 2021/0313081 A1 Oct. 7, 2021

Related U.S. Application Data

(62) Division of application No. 15/679,721, filed on Aug. 17, 2017, now Pat. No. 11,043,309, which is a division of application No. 13/649,419, filed on Oct. 11, 2012, now Pat. No. 9,875,818.

(51) Int. Cl.
*G21C 1/24* (2006.01)
*G21C 7/30* (2006.01)
*G21C 3/24* (2006.01)

(52) U.S. Cl.
CPC ............... *G21C 7/30* (2013.01); *G21C 1/24* (2013.01); *G21C 3/24* (2013.01); *Y02E 30/30* (2013.01)

(58) Field of Classification Search
CPC ...... G21C 1/20; G21C 1/22; G21C 1/24; G21C 1/30; G21C 3/44; G21C 3/46; G21C 3/48
See application file for complete search history.

(56) References Cited

U.S. PATENT DOCUMENTS

| | | | | |
|---|---|---|---|---|
| 2,743,225 A | * | 4/1956 | Ohlinger | G21C 1/24 376/288 |
| 2,902,424 A | * | 9/1959 | King | G21C 1/26 376/244 |
| 2,961,391 A | * | 11/1960 | King | G21C 1/24 376/358 |

(Continued)

FOREIGN PATENT DOCUMENTS

| | | | |
|---|---|---|---|
| CN | 100578681 C | * | 1/2010 |
| GB | 917606 A | * | 11/1960 |

*Primary Examiner* — Lily C Garner
(74) *Attorney, Agent, or Firm* — Nelson Mullins Riley & Scarborough LLP

(57) ABSTRACT

The present invention relates generally to the field of compensation methods for nuclear reactors and, in particular to a method for fail-safe reactivity compensation in solution-type nuclear reactors. In one embodiment, the fail-safe reactivity compensation method of the present invention augments other control methods for a nuclear reactor. In still another embodiment, the fail-safe reactivity compensation method of the present invention permits one to control a nuclear reaction in a nuclear reactor through a method that does not rely on moving components into or out of a reactor core, nor does the method of the present invention rely on the constant repositioning of control rods within a nuclear reactor in order to maintain a critical state.

18 Claims, 6 Drawing Sheets

(56) References Cited

U.S. PATENT DOCUMENTS

| | | | |
|---|---|---|---|
| 2,999,060 A * | 9/1961 | Teitel | G21C 7/30 976/DIG. 135 |
| 3,015,617 A * | 1/1962 | Brunings | G21C 1/24 376/310 |
| 3,073,767 A * | 1/1963 | Whitham | G21C 17/07 376/253 |
| 3,085,966 A * | 4/1963 | Flora | G21C 3/24 976/DIG. 31 |
| 3,166,480 A * | 1/1965 | Olle | G21C 1/24 976/DIG. 33 |
| 3,219,537 A * | 11/1965 | Janner | G21D 9/00 376/325 |
| 3,342,689 A * | 9/1967 | Roche | G21C 1/20 976/DIG. 139 |
| 3,494,829 A * | 2/1970 | Werner | G21C 1/24 376/901 |
| 3,536,584 A * | 10/1970 | Rawson | G21C 13/02 376/463 |
| 3,573,167 A * | 3/1971 | King | G21C 1/24 376/311 |
| 3,652,394 A | 3/1972 | Braun | |
| 3,816,244 A * | 6/1974 | Stracke | G21C 13/067 376/205 |
| 3,849,248 A | 11/1974 | Channon et al. | |
| 4,582,672 A | 4/1986 | Tuley, Jr. et al. | |
| 4,668,468 A | 5/1987 | Santucci | |
| 5,045,275 A * | 9/1991 | Abdel-Khalik | G21C 7/24 376/331 |
| 5,063,019 A | 11/1991 | Bowman | |
| 5,075,069 A | 12/1991 | Edlund et al. | |
| 5,130,078 A * | 7/1992 | Dillman | G21C 1/084 376/282 |
| 5,139,078 A | 8/1992 | Ames et al. | |
| 5,596,611 A | 1/1997 | Ball | |
| 5,910,971 A * | 6/1999 | Ponomarev-Stepnoy | G21G 1/02 376/189 |
| 9,875,818 B2 | 1/2018 | Nygaard et al. | |
| 11,043,309 B2 | 6/2021 | Nygaard et al. | |
| 2004/0062340 A1 | 4/2004 | Peterson | |
| 2006/0233685 A1* | 10/2006 | Janes | C01G 56/005 423/19 |
| 2009/0034674 A1 | 2/2009 | Burger et al. | |
| 2009/0225923 A1* | 9/2009 | Neeley | G21C 1/00 376/361 |
| 2010/0067641 A1 | 3/2010 | Yokoyama et al. | |
| 2012/0300890 A1* | 11/2012 | Piefer | G21G 1/08 376/158 |

\* cited by examiner

FAIL-SAFE REACTIVITY COMPENSATION METHOD FOR A NUCLEAR REACTOR

CLAIM OF PRIORITY

This application is a divisional of U.S. patent application Ser. No. 15/679,721, filed Aug. 17, 2017, now U.S. Pat. No. 11,043,309, which is a divisional of U.S. patent application Ser. No. 13/649,419, filed Oct. 11, 2012, now U.S. Pat. No. 9,875,818, the disclosures of which are hereby incorporated by reference in their entirety.

GOVERNMENT SUPPORT CLAUSE

This invention was made with Government support under Contract No. DE-FC52-09NA29596 awarded by the U.S. Department of Energy. The government has certain rights in the invention.

FIELD AND BACKGROUND OF THE INVENTION

1. Field of the Invention

The present invention relates generally to the field of reactivity compensation methods for nuclear reactors and, in particular to a method for fail-safe reactivity compensation in solution-type nuclear reactors. In one embodiment, the fail-safe reactivity compensation method of the present invention augments other control methods for a nuclear reactor. In still another embodiment, the fail-safe reactivity compensation method of the present invention permits one to control a nuclear reaction in a nuclear reactor through a method that does not rely on moving components into or out of a reactor core, nor does the method of the present invention rely on the constant repositioning of control rods within a nuclear reactor in order to maintain a critical state.

2. Description of the Related Art

Generally speaking, most nuclear fission reactors are controlled by control rods which are mechanically moved within the reactor core to control reactivity by changing the amount of neutron absorbing material in the reactor fission volume. The control rods can introduce a sufficient decrease in reactivity to control the reactor during positive reactivity transients arising from changing operating conditions. A reactivity control swing of only about one percent is typically adequate to provide control wherein the reactor can be reduced to a subcritical reactivity condition following a reactivity excursion. In routine reactor operations, an emergency insertion of the control rods is sometimes required to prevent an uncontrolled reactivity excursion.

It will be appreciated, however, that mechanical control rods have inherent limitations on the rate at which a negative reactivity can be inserted. Physical characteristics, such as inertia and rod length, limit the speed at which the control rod can be inserted into the reactor core. Further, the mechanical instability of the fuel elements in which the control rods are inserted can act to limit the insertion rate or even to preclude rod insertion.

Given this, some have proposed non-mechanical based methods for controlling the reactivity of a nuclear reaction. For example, U.S. Pat. No. 5,063,019 discloses a means for controlling the reactivity of nuclear reactors without utilizing moving mechanical means. As disclosed therein, such a method relies on the use of laser-induced polarization of Helium-3 atoms to alter the neutron absorption cross section.

Accordingly, given the above, a need exists in the art for a method that does not rely on mechanical movement to achieve control of, or supplement the control of, a nuclear reaction, or reactor.

SUMMARY OF THE INVENTION

The present invention relates generally to the field of compensation methods for nuclear reactors and, in particular to a method for fail-safe reactivity compensation in solution-type nuclear reactors. In one embodiment, the fail-safe reactivity compensation method of the present invention augments other control methods for a nuclear reactor. In still another embodiment, the fail-safe reactivity compensation method of the present invention permits one to control a nuclear reaction in a nuclear reactor through a method that does not rely on moving components into or out of a reactor core, nor does the method of the present invention rely on the constant repositioning of control rods within a nuclear reactor in order to maintain a critical state.

Accordingly, one aspect of the present invention is drawn to a method for controlling the reactivity in a solution nuclear reactor, the method comprising the steps of: (a) supplying a solution nuclear reactor having a nuclear reactor vessel therein; (b) placing one or more standpipes located in at least one low worth area of the nuclear reactor vessel, the one or more standpipes having an open end located at a level below a solution level in the solution contained in the nuclear reactor vessel of the solution nuclear reactor; (c) supplying at least one gas system, wherein the at least one gas system is in fluidic communication with one or more of the standpipes; and (d) controlling the fluid level in the one or more standpipes via the use of the at least one gas system such that the solution nuclear reactor is maintained in a fail-safe mode.

In yet another aspect of the present invention, there is provided a method for augmenting the control of the reactivity in a solution nuclear reactor, the method comprising the steps of: (i) supplying a solution nuclear reactor having a nuclear reactor vessel therein; (ii) placing one or more standpipes located in at least one low worth area of the nuclear reactor vessel, the one or more standpipes having an open end located at a level below a solution level in the solution contained in the nuclear reactor vessel of the solution nuclear reactor; (iii) supplying at least one gas system, wherein the at least one gas system is in fluidic communication with one or more of the standpipes; and (iv) controlling the fluid level in the one or more standpipes via the use of the at least one gas system such that the solution nuclear reactor is maintained in a fail-safe mode.

In yet another aspect of the present invention, there is provided a system for controlling a solution nuclear reactor comprising: (A) a solution nuclear reactor having a nuclear reactor vessel therein; (B) one or more standpipes located in at least one low worth area of the nuclear reactor vessel, the one or more standpipes having an open end located at a level below a solution level in the solution contained in the nuclear reactor vessel of the solution nuclear reactor; (C) at least one gas system, wherein the at least one gas system is in fluidic communication with one or more of the standpipes, wherein the fluid level in the one or more standpipes is controlled via the use of the at least one gas system such that the solution nuclear reactor is maintained in a fail-safe mode.

In yet another aspect of the present invention, there is provided a system for augmenting the control of the reactivity in a solution nuclear reactor comprising: (I) a solution nuclear reactor having a nuclear reactor vessel therein; (II) one or more standpipes located in at least one low worth area of the nuclear reactor vessel, the one or more standpipes having an open end located at a level below a solution level in the solution contained in the nuclear reactor vessel of the solution nuclear reactor; (III) at least one gas system, wherein the at least one gas system is in fluidic communication with one or more of the standpipes, wherein the fluid level in the one or more standpipes is controlled via the use of the at least one gas system such that the solution nuclear reactor is maintained in a fail-safe mode.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
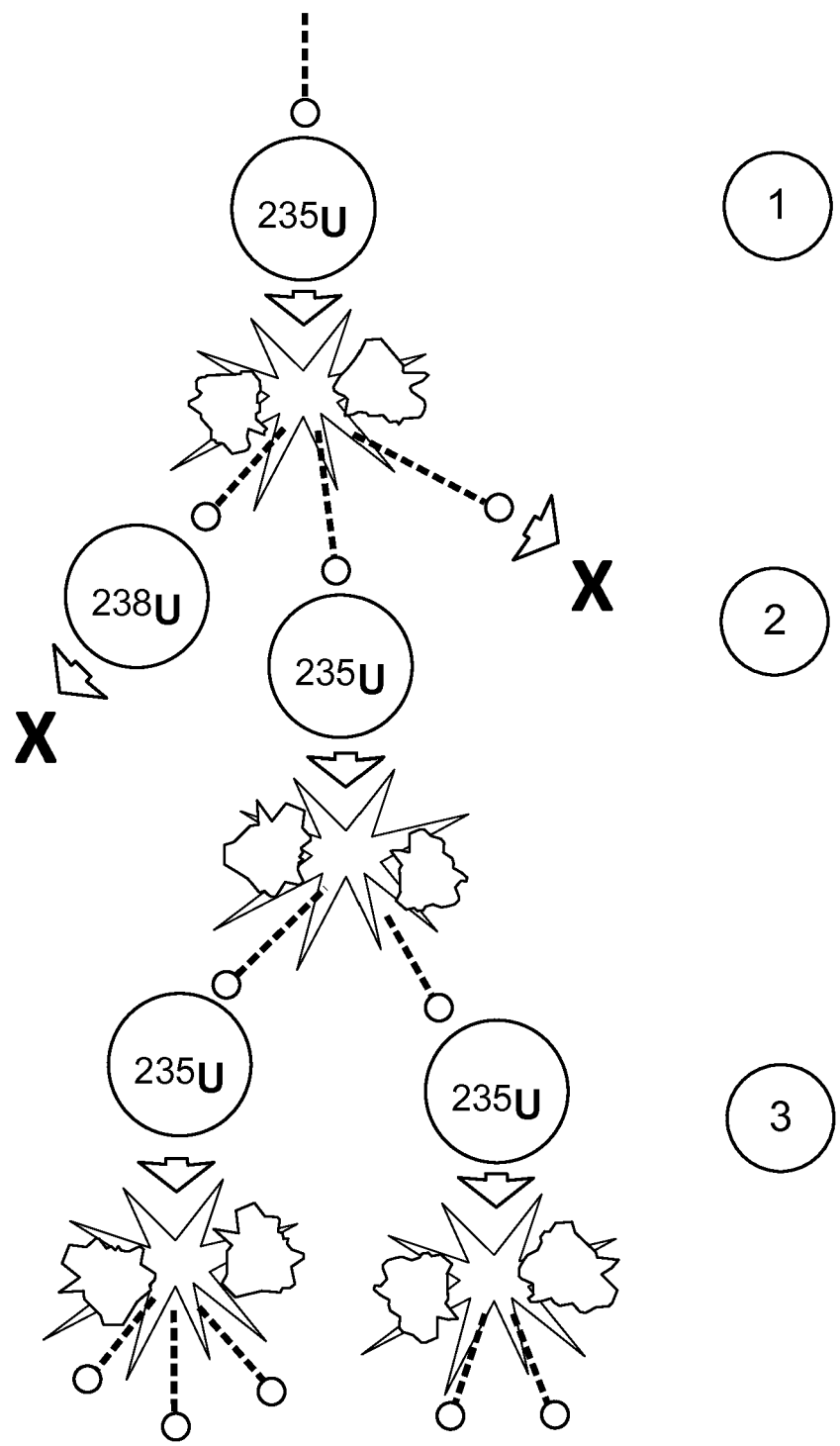
FIG. 1 is an illustration of a fission chain reaction.

The present invention relates generally to the field of compensation methods for nuclear reactors and, in particular to a method for fail-safe reactivity compensation in solution-type nuclear reactors. In one embodiment, the fail-safe reactivity compensation method of the present invention augments other control methods for a nuclear reactor. In still another embodiment, the fail-safe reactivity compensation method of the present invention permits one to control a nuclear reaction in a nuclear reactor through a method that does not rely on moving components into or out of a reactor core, nor does the method of the present invention rely on the constant repositioning of control rods within a nuclear reactor in order to maintain a critical state.

While the present invention will be described in terms of an Aqueous Homogeneous Reactor (AHR), the present invention is not limited to just AHRs. Rather, the present invention can be utilized in conjunction with any type of reactor to supplement the reactivity control system thereof regardless of whether such reactor is an AHR. Additionally, it should also be noted that the present invention could be used in a sub-critical nuclear assembly (e.g., a critical experiment or a driven fissile solution designed to stay sub-critical). In this instance, the present invention could be utilized to mitigate, control and/or prevent an accident via the movement of solution through a standpipe. Thus, in this instance sub-critical assemblies, driven sub-critical and/or processing facilities could also qualify as reactors within the scope of the present invention.

In one embodiment, the present invention presents a reactivity compensation method for the fail-safe control of a nuclear chain reaction for a solution type nuclear reactor. A solution-type nuclear reactor is one means by which one can produce medical isotopes from a nuclear fission reaction. However, solution type reactors are not limited to just medical isotope production applications as such reactors tend to offer the benefit of better stability. Although the present invention will be described in related to an Aqueous Homogeneous Reactor (AHR), a type of solution reactor, the present invention is not limited solely thereto. Rather, the present invention can be applied to a variety of nuclear reactor designs including, but not limited to, all types of solution nuclear reactors.

In one embodiment, the reactivity compensation described here in comprises both a method and structural design that enables one to alter the reaction rate of a nuclear fission chain reaction to achieve a desired effect without the need for, or use of, any mechanical motion within the core. The failsafe feature integral to this design relies on the fact that upon utilizing or disengaging this method, the fission chain reaction is not "divergent" or uncontrolled.

In one embodiment, the reactivity compensation method and design of the present invention augments a traditional method of controlling reactivity within an operating solution reactor core. As is known to those of skill in the art, the normal means of reactor control for most reactor types is provided by fixed control rods that employ either fissile fuel or a neutron poison. Rigid control rods can be either inserted into, or withdrawn from, a reactor by mechanical means to achieve a desired fission reaction state. Again, as is known to those of skill in the art, the rate of insertion and withdrawal can either have a small or drastic effect on reactor conditions.

For rapid reactor shutdown, a control rod inserted through the length of the core can terminate the chain reaction effectively. However, the desire for subtle, small, or incremental changes in the core during steady state high power operation requires additional control schemes to be considered. Thus, in one embodiment, the present invention and related structural design, or system, provides a method that permits one to achieve a more detailed and/or effective control of a fission reaction. As noted above, the method and structural design of the present invention does not rely on moving components into, or out of, the reactor core, or the need for the constant repositioning of control rods in order to maintain a desired critical state. Furthermore, as the reactor state changes, there would be no need to automatically "chase power" by control rod manipulation.

A brief discussion on the fission chain reaction and reactivity is necessary to understand the method and structural design of the present invention. A fission chain reaction is illustrated in FIG. 1. As illustrated in FIG. 1, a source neutron starts the chain reaction. This neutron causes fission in uranium and results in the creation of: (1) fission fragments; (2) neutrons and photons; and (3) a release of energy.

In some instance, the fission fragments may also expel a neutron some time after the initial fission event. These neutrons are called "delayed" neutrons, contrasting to the "prompt" neutrons produced, or yielded, from the prompt fission of a fissile nucleus. The neutrons born from fission, either delayed or prompt, can continue to cause subsequent fission in a fissile material, causing a repeat in the cycle. A neutron population is characterized by "generations." In FIG. 1, three generations are illustrated from a single source neutron. A chain is divergent if the number of neutrons increases over all generations.

The neutron multiplication factor, $k_{eff}$, describes the state of the neutron population from a present generation to the next generation. Thus, in simple terms, $k_{eff}$ represents the ratio of neutrons from the next generation (g+1) to the present generation (g) as $N_{g+1}/N_g$. The multiplication factor changes as the neutron population changes from generation to generation. The "criticality" of a reactor is related to the multiplication factor. The "criticality" can be characterized as critical, subcritical, or supercritical.

For a critical reactor system, characteristic of steady state conditions, the population of neutrons from generation to generation does not change, and the ratio of populations given by the multiplication factor $k_{eff}$ is equal to unity (i.e., $k_{eff}=1$). For a subcritical system, the neutrons in the next generation are less than the neutrons in the present generation, and the multiplication factor $k_{eff}$ is less than unity (i.e., $k_{eff}$ is less than 1). Thus, the neutron population decreases over time to an equilibrium level determined by the subcritical multiplication factor of the system in question. For a supercritical system, where the number of neutrons in the next generation is greater than the present generation, $k_{eff}$ is greater than unity (i.e., $k_{eff}$ is greater than 1), and the neutron population increases over time. In this case, the increase is exponential, and it does not require significant generations to quickly increase the population. This is the case for power increase, also termed a divergent chain reaction.

The term "reactivity" is defined as a change in the criticality or neutron multiplication factor from an original state to a changed, or perturbed, state. A perturbation in the reactor can occur due to any physical change in the system from an initial state. For example, the introduction of voids in the solution or temperature in a reactor can alter the neutron interaction rate and create a new condition. For a change from a steady state or critical reactor condition, the reactivity is represented by rho (☐) as $p=(k_{eff}-1)/k_{eff}$.

If the reactor remains critical over time, the reactivity, or change in $k_{eff}$ from the initial critical condition ($k_{eff}=1$) describing this system would be zero. For a change in $k_{eff}$ leading to a net increase in neutron population, reactivity is a positive value. For a change leading to net decrease in the neutron population, reactivity is a negative value. For most stability criteria, reactivity coefficients, that is, the change in reactivity versus a change in a parameter x (Δ☐/Δx) must be negative. Thus a change in reactivity for a change in parameter x will affect a negative feedback to the neutron population and will not result in a divergent chain reaction.

As is known to those of skill in the art, nuclear criticality safety is a field of nuclear engineering that is dedicated to the prevention of a self-sustaining chain reaction outside of a reactor environment. This specialty practice is very important where fissile solutions are located to ensure a divergent chain reaction is prevented. The features of a solution-type nuclear reactor permit the principles of nuclear criticality safety to be applied to the present invention, and permit the method of the present invention and its structural design to achieve control of, or augment the control of, a nuclear reaction, or reactor.

One point of consideration is that unlike situations outside of a reactor core, a nuclear reactor is deliberately designed to operate within a known range of nuclear parameters where criticality can be safely controlled. However, whether fissile material is located inside or outside a reactor, the physics and parameters that determine the criticality of the system remain universal.

One factor that influences the criticality of the system is the leakage of neutrons from the geometry or shape of fissile material. If neutrons escape (i.e., leak from) from the fissile system, such neutrons are then not available to interact with the fissile material to create a fission event and continue the chain reaction. Therefore, the shape of the fissile material influences the probability of creating a fission event and sustaining a chain reaction.

A documented criticality accident outside a reactor that involved a fissile solution shape change occurred in December 1958 (see, McLaughlin, T. P. et. al; *A Review of Criticality Accidents,* 2000 Revision, LA-13638). The accident occurred when the action of a mechanical stirring device located in the bottom of a process vessel containing plutonium solution caused a vortex thereby resulting in the phase separation of the denser fissile medium (plutonium) from the aqueous component of solution. This event illustrates that a shape change can have negative consequences that must be avoided.

A fissile solution can be made subcritical by design by limiting any one of several parameters, such as geometry (see, Consensus Standard ANS-8.1, *Nuclear Criticality Safety in Operations with Fissionable Materials Outside Reactors*, ANS-8.1, Reaffirmed 1998, American Nuclear Society, La Grange Park Ill) provides specification for maintaining subcritical parameters. Operations with fissile materials can be performed safely by compliance to any one of the single parameter subcritical limits. For a critical reactor, the subcritical limits are not applicable in the reactor design. However, for the reactivity compensation method of the present invention the subcritical parameter limits need to be considered.

For example, for highly enriched uranyl nitrate $^{235}UO_2(NO_2)_3$, a subcritical limit for the diameter of a cylindrical column would be 14.4 cm (5.6 inches), and a subcritical limit for the volume would be 6.2 liters. The "optimal geometry" corresponds to the particular geometry that will result in a critical configuration with the smallest mass. For a cylinder, this is represented by a height to diameter ratio (H/D) close to unity.

For a solution reactor, the diameter D is fixed by design, however the height H can change if the density of the solution changes (e.g., by the presence of voids, thermal expansion, etc.). Another way to change height is to add fissile solution to the reactor. However, this adds fissile mass to the system. If the density of the solution is held constant, the change in geometry for a given fixed mass will result in a reactivity change by affecting the neutron reaction rates and leakage from the system.

A physical characteristic of a critical reactor system is to define the "geometric buckling," $Bg^2$. This term is unique for specific geometries such as a sphere, or cylinder, and incorporates dimensional parameters such as diameter D and height H. In a nuclear reactor, criticality is achieved when the rate of neutron production is equal to the rate of neutron loss, including both neutron absorption and neutron leakage.

Geometric buckling is a measure of neutron leakage, while material buckling is a measure of neutron production minus absorption. In the simplest case of a bare homogeneous, critical reactor, the geometric and material buckling are equal. By altering the geometry of the reactor, while preserving material properties, the criticality, and reactivity of the system can be altered.

The reactivity compensation method and design structure of the present invention provides a non-mechanical method and system for the deliberate movement of fissile solution within a reactor by utilizing a "manometer effect." The resultant shape change to the reactor alters geometric buckling $Bg^2$. The shape change affects the reactor neutron leakage and results in a reactivity change that can be controlled and calibrated. Given the above, the present invention provides both a method and a structural design to produce this change.

Figure 2:
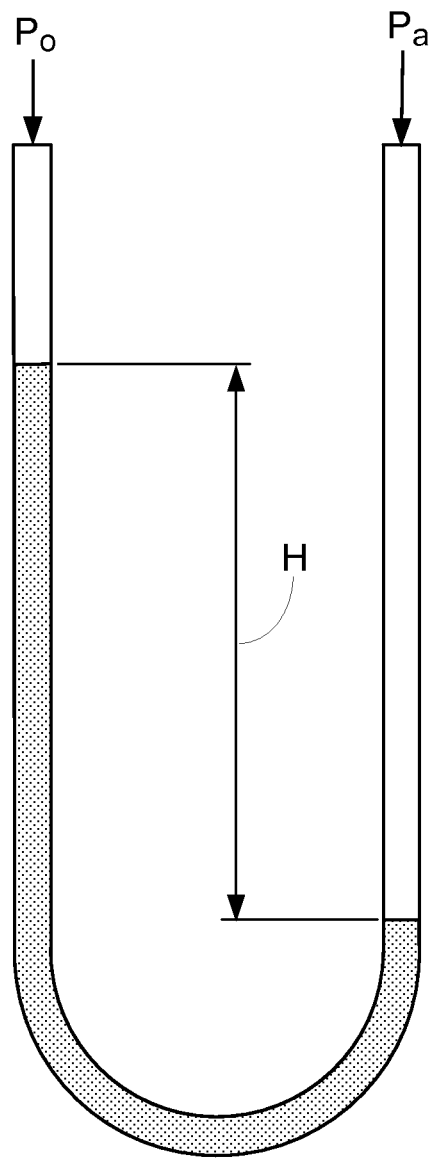
FIG. 2 is an illustration of a U-tube manometer.

A principle that is common in hydrostatic instruments relies on a differential pressure between fluid surfaces. One application is a "U-tube manometer" as shown in FIG. 2. In FIG. 2, the difference in fluid height H between two columns is proportional to the pressure exerted on the fluid through one leg of the column $P_o$ and $P_a$.

Consider now, how this physical principle can be utilized in a reactivity compensation mechanism within a solution reactor. A U-tube is formed by a standpipe within a reactor vessel. A reactor with a desired placement of one or more vertical standpipes can achieve the effect seen in a U-tube manometer provided the fluid utilized is free to move within the standpipes and the reactor in the form of a solution can enter from the bottom of the vessel.

The pressure difference between the fluid in the standpipes and the fluid outside the standpipes (reactor pressure) will effectively change the height, or the level, of the solution in the reactor and the standpipes. This change in height in both locations affects the geometry of the core, and hence, the reactivity thereof.

Figure 3A:
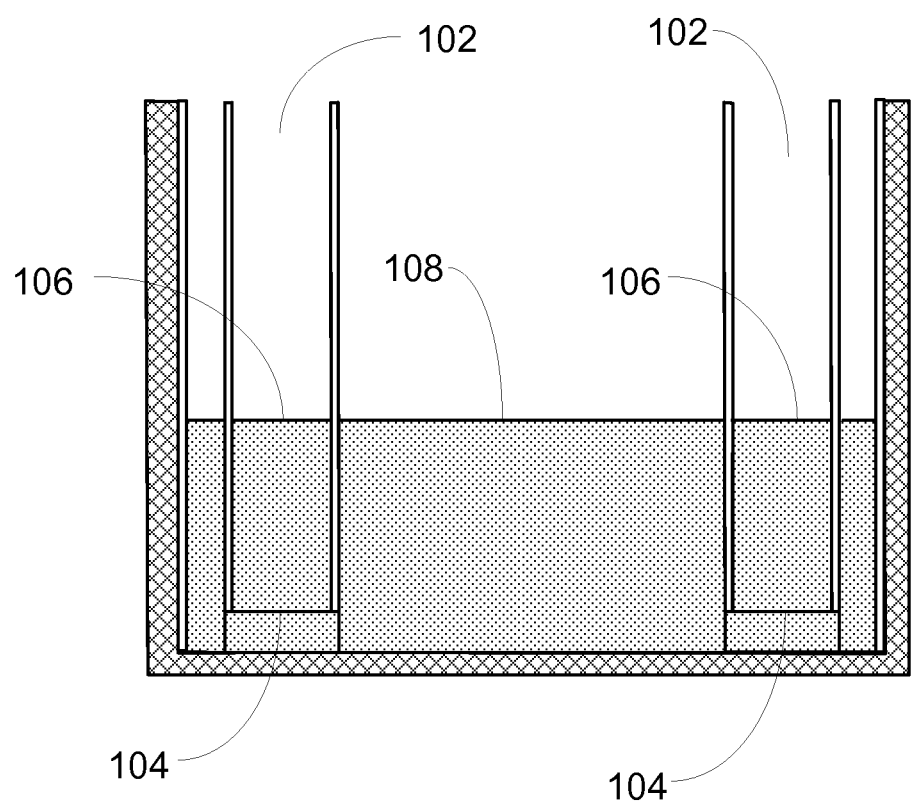
FIG. 3a is an illustration, in the y-z plane, of a solution reactor having a control system in accordance with one embodiment of the present invention.
Figure 3B:
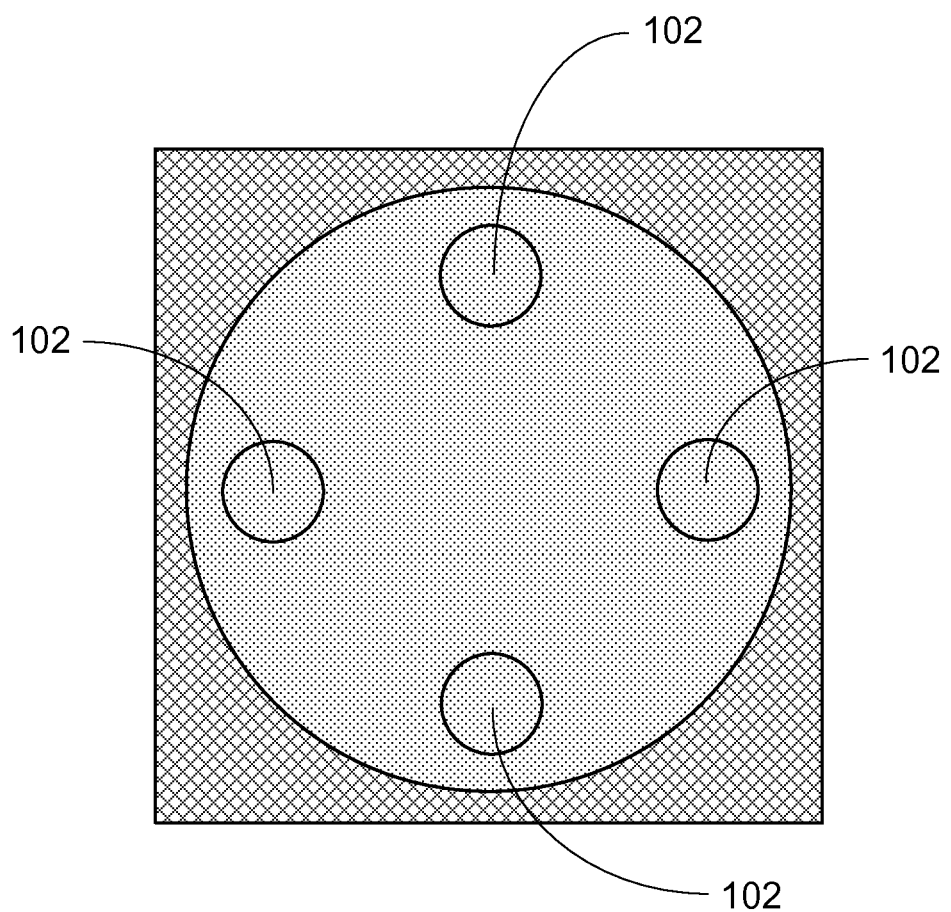
FIG. 3b is an illustration, in the x-z plane, of a solution reactor having a control system in accordance with one embodiment of the present invention.

Turning to FIGS. 3a and 3b, FIG. 3a illustrates (in the y-z plane) and FIG. 3b (in the x-z plane) a solution reactor represented by a cylinder. The diameter of the cylinder which is beyond the subcritical radius for criticality safety can be operated safely by controlling the solution height, and providing safety control rods as previously noted. Within the cylinder are depicted four (4) vertical standpipes 102, each of with a diameter below the single parameter subcritical limit, each standpipe 102 having a suitably sized opening 104 located at the bottom thereof. However, it should be noted that the present invention is not limited to four vertical standpipes. Rather, any suitable number of one or more vertical standpipes can be utilized depending upon various factors including, but not limited to, the size of the reactor to which the structural design of the present invention is be applied.

It should be noted that it is important that the diameter of the standpipes is below the single parameter subcritical limit as noted in Consensus Standard ANS-8.1, *Nuclear Criticality Safety in Operations with Fissionable Materials Outside Reactors*, ANS-8.1, Reaffirmed 1998, American Nuclear Society, La Grange Park Ill, to ensure that an inadvertent criticality is not possible once solution is pushed, or pulled, within the standpipe by a pressure differential. In this initial condition, the pressure on the solution 106 within standpipe 102 is equal to the pressure on the solution 108 outside the standpipe (the reactor pressure) and the respective solution levels 106 and 108 inside standpipes 102 and outside standpipes 102 are equal.

An additional consideration in the design of the location of the standpipes is, in one embodiment, to prevent the solution within the standpipes from "interacting" with each other as solution is "pulled" into the pipes. If the standpipes are located too close together, one or more neutrons leaking from one standpipe could conceivably enter another standpipe and contribute to a chain reaction. Even though the pipes are individually less than the single parameter diameter, the interaction of individual standpipes with each other is a consideration. Array interaction is another concern from a nuclear criticality safety standpoint that can be applied to the design of the method and structure of the present invention.

In one embodiment, the relative location of the standpipes in relation to the core geometry is also taken into consideration. In this embodiment, two or more standpipes are located on the periphery of the core, inside the vessel. For this particular geometry, the location of the standpipes is in "low reactivity worth" areas of the core. The "reactivity worth" relates the importance of certain regions in the reactor to how these regions affect the chain reaction. In one embodiment, it is desirable to place standpipes in relative low worth areas versus a high worth area, since if placed in the latter the change in respective solution heights may not lead to a desired fail-safe condition.

Figure 4:
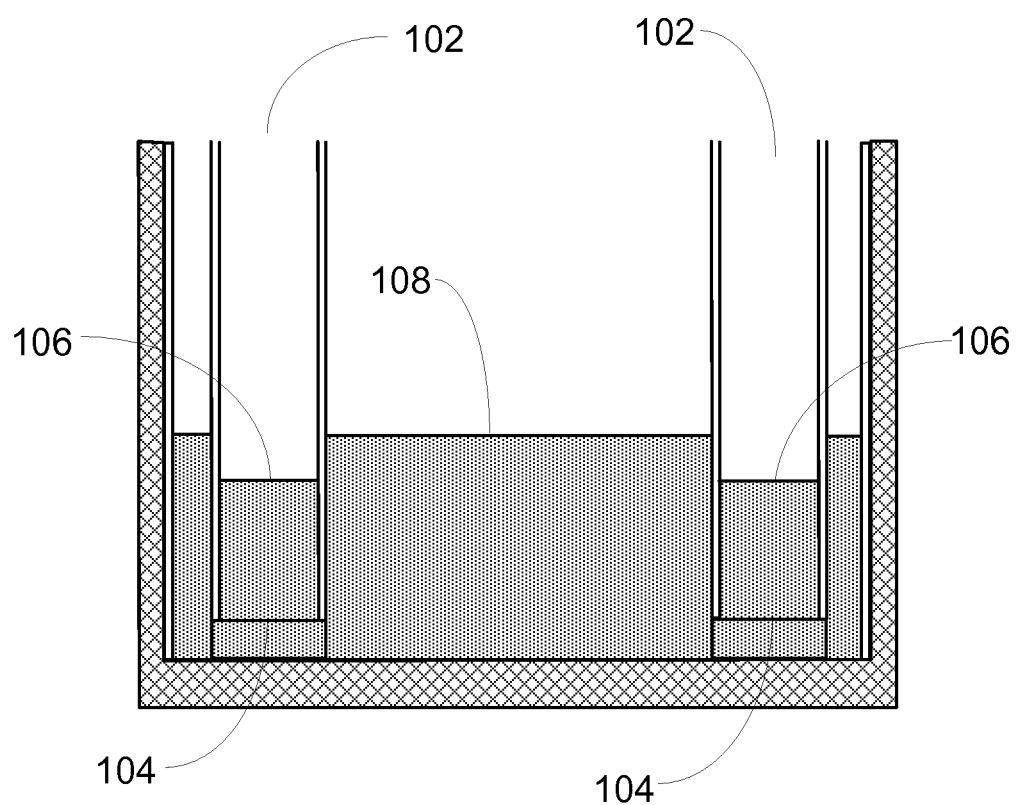
FIG. 4 is an illustration, in the y-z plane, of the solution reactor of FIGS. 3a and 3b where the solution in the standpipes has been pressurized.

FIG. 4 illustrates the same core geometry as in FIGS. 3a and 3b. However, in this case, a pressure has been applied to the solution within standpipes 102 externally by a gas system 120 (see FIG. 5) that is suitable and is attached, or in fluidic communication, with the tops of one or more of standpipes 102. It should be noted that any suitable gas system can be utilized in conjunction with the present invention. Examples of suitable gas systems include, but are not limited to, a catalytic recombiner system that converts hydrogen and oxygen gas into water; a blower to maintain proper differential pressure throughout the system; a system that utilizes a variable vacuum to keep differential pressure within a desired control band, or a combination of two or more thereof. Additionally, in other embodiments of the invention, different methods for pressure control can be implemented. Such additional pressure control methods include, but are not limited to, a pump to maintain proper pressure throughout the system and/or a different fluid instead of gas (e.g., water, salts, molten metal, etc.).

In another embodiment, different gas systems can be used depending on their desired functions. Two primary functions of a gas system for AHRs/fissioning solutions are to maintain pressure and sweep gas. Pressure can be maintained using various methods whether by maintaining a head using a cover gas or by maintaining a vacuum in the system. A sweep gas can be used in order to remove hazardous gases from the system. These gases may be combustible, radioactive, and/or toxic and may have to be removed for processing, storage, and/or disposal purposes away from the AHR/fissioning solution.

In one embodiment, the pressure that is supplied by gas system 120 is regulated by one or more pressure control valves (not pictured). In one embodiment, each individual standpipe 102 can have its own gas system. In another embodiment, an individual gas system can be designed to supply gas pressure to any two or more standpipes (if two or more standpipes are present). In still another embodiment, one gas system can be designed to supply gas to all of the standpipes present.

The pressure control valves can be operated remotely by an operator on demand, or automatically as part of a feedback control program. For FIG. 4, the pressure exerted on the solution by the gas in each standpipe 102 is greater than the pressure exerted on the solution within the reactor vessel that is outside each standpipe 102. Thus, a "manometer effect" results. In this instance, the solution 106 is "pushed" out of the standpipe and the level 108 outside standpipes 102 increases. Given the above, in one embodiment the present invention is directed to a system that when positively pressurized (i.e., the pressure is in excess of what is present in the reactor enclosure), solution is forced out of the one or more standpipes 102 and level 108 increases thereby causing an increase in the reactivity of the reactor. On the other hand, when the system is negatively pressurized so as to cause more solution to flow into and up the one or more standpipes 102, reactivity is decreased and the reaction in the reactor enclosure is controlled, mitigated and/or reduced. This can, in some circumstances, result in, or achieve, a lower reaction state and/or a fail-safe state.

Using the criticality code MCNP (see, Briesmeister, J., MCNP—*A General Moste Carlo N-Particle Transport Code—Version* 5, (2003) Los Alamos National Laboratory, Los Alamos NM) the $k_{eff}$ of the condition shown in FIG. 3*a* is equal to 0.99600. For FIG. 4, the MCNP criticality calculation results in a $k_{eff}$ of 1.00130. The reactivity of this system is (1.00130−0.99600)/0.99600 or 0.005321. To express this reactivity worth in units of "dollars," where one dollar is a delayed neutron fraction (0.007), the reactivity "worth" is 0.005321/0.007=$0.76. The safety of the system should, in one embodiment, be designed such that $1 of reactivity is not added to the system. In the case where $1, or more, of reactivity is added to the system, the system achieves a "prompt critical condition" which would result in an accident condition.

To protect against this condition, the reactor will be required to shut down or "scram" well below this reactivity addition. In one example, the change in height in standpipes 102 is approximately 5.33 cm below the original height and the difference in the height in the reactor solution level 108 is 0.5 cm above the original height. Thus, a calibrated trip point corresponding to a specific solution height in either inside standpipe 102, or outside, could be designed to prevent undesired reactivity changes.

In this particular example, by providing a pressure differential to solution within the one or more standpipes 102, the change in height in solution inside the one or more standpipes 102 and outside the one or more standpipes 102 results in a positive reactivity change. For this consideration, the net reactivity loss would be negative upon loss of pressure capability.

Figure 5:
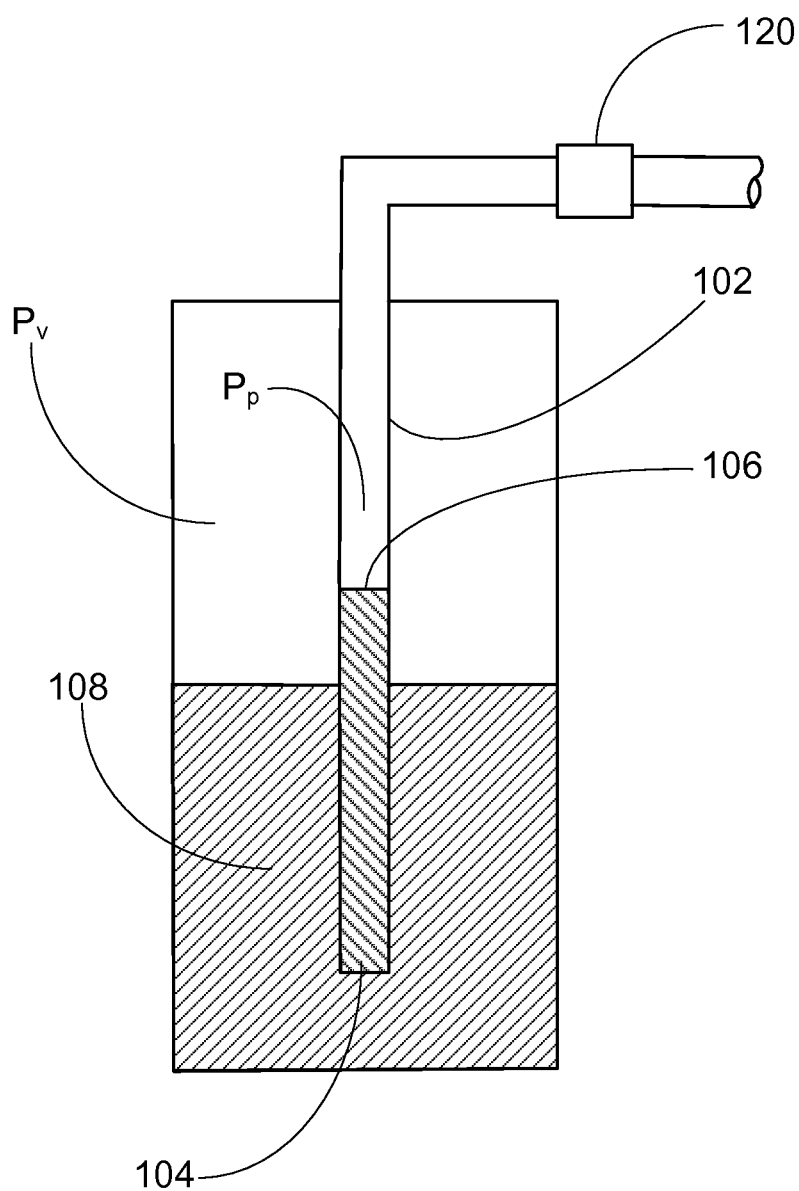
FIG. 5 is an illustration, in the y-z plane, of a simplified solution reactor similar to that in FIGS. 3a, 3b and 4, where the solution in a standpipe has been negatively pressurized.

When the pressure in the one or more standpipes 102 is lost, the level in each of the one or more standpipes 102 and reactor will equilibrate, and return the level in both the one or more standpipes 102 and reactor to the previous state. Thus the "fail-safe" feature of this embodiment is demonstrated with the selection of standpipe diameter and location in the reactor vessel. If the standpipes are located in a high worth section (the central section of the vessel), then perturbing the core would lower reactivity, and upon a failure would result in a positive reactivity, which is not fail-safe. This configuration is illustrated in FIG. 5.

In one embodiment, the method and design structure of the present invention provides a reactivity change that is due to the introduction of a pressurized gas external to the reactor. Thus, the method and system of the present invention does not require any mechanical movement of control rods within the reactor, and therefore achieves a geometry change without the use of a mechanical system based on movement of a mechanical portion thereof. Since the mass of fissile material does not change, the reactivity change provided by the method and system of the present invention via a relative difference in solution height is sufficient to achieve control of a reactor, or augmentation of the control thereof.

In another embodiment, because the level of the present invention utilizes a standpipe solution that is based on pressure, a reactor safety control system in accordance with the present invention can be applied to a differential pressure level that can be regulated through a feedback mechanism. Thus, there is a way to limit the pressure applied by an operator, or program, and ensure that reactor safety is not compromised by an inadvertent pressurization of the standpipes.

As will be detailed below, in an exemplary situation, an exercise is undertaken to show that the height difference in the solution within the pipes is a function of the pipe diameter and number of pipes. The number of standpipes needed to affect a desired reactivity change is a matter of system design and calibration. In one embodiment, a collection of standpipes could be operated independent of each other, or as a collective "bank" depending on the reactivity change desired.

The fail-safe feature of the reactivity compensation method and system of the present invention is inherent in its design, as a loss of function must always place the reactor in a safe configuration. In order to demonstrate this capability, the following conditions must be satisfied: (a) the fissile solution must remain homogeneous during the reactivity compensation, e.g., there must not be a phase change or physical separation or stratification of aqueous solution; (b) the reactivity compensation method and system must not result from mechanical movement of any design feature within the reactor core; (c) the reactivity coefficients must not be allowed to become positive (although they can be allowed to become less negative) by the design and operation of the compensation method and system of the present invention; (d) the geometric shape change must be controlled and calibrated as a uniform change in fissile solution level within the reactor; (e) the resulting change in solution level must be such that any failure of the system will restore the level to the previous condition, thus returning the reactivity to zero or negative; (f) there is an upper and lower solution level where the reactivity compensation is restricted (a deviation from this range will result in reactor shutdown, terminating the chain reaction); (g) there is a "dead band" range of solution level heights between which the reactivity is not compensated by any action (this dead band is the preferred stability range of constant power operations where net reactivity is zero over time); and (h) the inadvertent pressurization or depressurization of the one or more standpipes 102 containing fissile solution must place the reactor in a safe condition.

Turning to FIG. 5, FIG. 5 is an illustration, in the y-z plane, of a simplified solution reactor similar to that in FIGS. 3*a*, 3*b* and 4, where the solution in standpipe 102 has been negatively pressurized via gas system 120 which contains thereon one or more control valves. As can be seen in FIG. 5, the level 108 of the solution in the reactor is less than the level 106 of the solution in standpipe 102.

In one instance, the diameter of standpipe 102 of FIG. 5 is 4 inches (or 10.16 centimeters). It should be noted that for uranium, the subcritical limit for the diameter of standpipe 102 is 14.4 centimeters (or about 5.67 inches). In light of the present invention, the change in solution height is determined as detailed by the equations below where the area of free solution ($A_s$) without any standpipes is:

$$A_s = (\pi)(\text{radius of the reactor})^2,$$

and where the area inside ($A_p$) each of the one or more standpipes 102 is:

$$A_p = (\pi)(\text{radius of the inner pipe diameter})^2,$$

and where the area of each standpipe's footprint ($A_F$) is:

$$A_F = (\pi)(\text{radius of the outer pipe diameter})^2,$$

and where adding standpipes reduces the free surface ($A_s'$) of the reactor according to the following equation:

$$A_s' = (A_s) - (n)(A_f),$$

where n is the number of standpipes 102 and $A_s$ and $A_f$ are as defined above. Additionally, the solution in the one or more standpipes 102 changes ($\Delta H_p$) according the following equations when the solution in the reactor changes ($\Delta H_s$):

$$[(A_s) - (n)(A_f)] \cdot \Delta H_s = [(n)(A_p)] \cdot \Delta H_c$$

$$\Delta H_c = ([(A_s) - (n)(A_f)] / [(n)(A_p)]) \cdot \Delta H_s.$$

Additionally, the pressure differential between the reactor plenum ($P_r$) and the pressure in a standpipe ($P_p$) is defined as:

$$\Delta H_c = (P_r - P_p)/(g \cdot \rho_s)$$

where $P_p = P_r \pm H_c \cdot g \cdot \rho_s$ where the ± depends on the direction of solution movement. Thus, given the above, $\Delta H_c$ and $P_p$ are dependent on the total cross-sectional area of the one or more standpipes 102 and/or the total number of standpipes 102 utilized. Additionally, as the number of standpipes 102 approaches infinity, $\Delta H_c / \Delta H_s$ decreases towards zero.

Regarding the gas, or gases, utilized in the system of the present invention, suitable gases are inert gases including, but not limited to, nitrogen ($N_2$), helium, air, or combinations of two or more thereof. In another embodiment, suitable gases for use in conjunction with the present invention include, but are not limited to, oxygen ($O_2$), and hydrogen. Additionally, it is also important to consider, and when needed remove, radiolytic gases and/or fission product gases. In one embodiment, radiolytic gases are formed when fission products collide and dissociate other molecules like water and nitric acid. Examples of radiolytic gases that should be removed from the reactor include, but are not limited to, hydrogen, oxygen, or other flammable gases. Examples of fission product gases which should also be removed from the reactor include, but are not limited to, krypton, xenon, or mixtures thereof. Thus, in one embodiment, radiolytic gases and/or fission product gases are controlled in the reactor interior via the use of a sweeping gas that is supplied via one or more of standpipes 102. In another embodiment, the supply of sweeping gas can be further supplemented by the use of a conventional dedicated sweeping gas supply line that is placed at one or more locations in the interior of the reactor (not shown).

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

The invention claimed is:

1. A method for controlling the reactivity in a solution nuclear reactor, the method comprising the steps of:
   (a) supplying a solution nuclear reactor having a nuclear reactor vessel therein;
   (b) placing one or more standpipes located in at least one low worth area of the nuclear reactor vessel, each of the one or more standpipes having a top end and an opening for passage of the solution located at a level below a solution level of the solution contained in the nuclear reactor vessel of the solution nuclear reactor;
   (c) supplying at least one gas system, wherein the at least one gas system is in fluidic communication with one or more of the standpipes; and
   (d) controlling a fluid level of the solution in the one or more standpipes via gas of the least one gas system such that the solution nuclear reactor is maintained in a fail-safe mode, wherein the gas is selected from nitrogen, helium, oxygen, hydrogen, air, or combinations of two or more thereof.

2. The method of claim 1, wherein the solution in the solution nuclear reactor remains homogeneous during control of the reactivity.

3. The method of claim 1, wherein the reactivity in the solution nuclear reactor is controlled without the use of any mechanical movement of any design feature within a reactor core of the solution nuclear reactor.

4. The method of claim 1, wherein the reactivity coefficients of the solution nuclear reactor are not permitted to become positive during the controlling of the fluid level in the one or more standpipes.

5. The method of claim 1, wherein any failure of the controlling of the fluid level in the one or more standpipes results in the restoration of the solution level to a fail-safe condition.

6. The method of claim 1, wherein any inadvertent pressurization and/or depressurization of the one or more standpipes containing fissile solution results in the solution nuclear reactor being in, maintaining, and/or achieving a fail-safe condition by equalization of the solution level inside and outside the one or more standpipes via the opening in respective of the one or more standpipes.

7. A method for augmenting the control of the reactivity in a solution nuclear reactor, the method comprising the steps of:
   (i) supplying a solution nuclear reactor having a nuclear reactor vessel therein;
   (ii) placing one or more standpipes located in the nuclear reactor vessel, each of the one or more standpipes having a top end and an opening for passage of the solution located at a level below a solution level in the solution contained in the nuclear reactor vessel of the solution nuclear reactor;
   (iii) supplying at least one gas system, wherein the at least one gas system is in fluidic communication with one or more of the standpipes; and
   (iv) controlling a fluid level of the solution in the one or more standpipes via gas of the least one gas system such that the solution nuclear reactor is maintained in a fail-safe mode, wherein the gas is selected from nitrogen, helium, oxygen, hydrogen, air, or combinations of two or more thereof.

8. The method of claim 7, wherein the solution in the solution nuclear reactor remains homogeneous during control of the reactivity.

9. The method of claim 7, wherein the reactivity in the solution nuclear reactor is controlled without the use of any mechanical movement of any design feature within a reactor core of the solution nuclear reactor.

10. The method of claim 7, wherein the reactivity coefficients of the solution nuclear reactor are not permitted to become positive during the controlling of the fluid level in the one or more standpipes.

11. The method of claim 7, wherein any failure of the controlling of the fluid level in the one or more standpipes results in the restoration of the solution level to a fail-safe condition.

12. The method of claim 7, wherein any inadvertent pressurization and/or depressurization of the one or more standpipes containing fissile solution results in the solution nuclear reactor being in, maintaining, and/or achieving a fail-safe condition by equalization of the solution level inside and outside the one or more standpipes via the opening in the respective of the one or more standpipes.

13. A method of adjusting the reactivity in a solution nuclear reactor having a reactor core in a reactor vessel and at least one standpipe located in the reactor vessel, said standpipe having a first opening above a level of solution in the vessel and a second opening below the level of the solution in the vessel for passage of the solution into and out of the standpipe, the method comprising the steps of:
  (i) supplying a selected gas into the first opening of the standpipe at a pressure sufficient to force a first quantity of the solution from the standpipe through the second opening so as to raise the level of the solution outside the standpipe; and
  (ii) subsequently removing at least a portion of the selected gas from the standpipe via the first opening so that a second quantity of the solution flows into the standpipe through the second opening so as to lower the level of the solution outside the standpipe.

14. The method of claim 13, wherein the first quantity of the solution and the second quantity of the solution are equal.

15. The method of claim 13, wherein the level of the solution outside the standpipe before step (i) and after step (ii) are the same.

16. The method of claim 13, wherein the level of the solution outside the standpipe before step (i) and after step (ii) are different.

17. The method of claim 13, wherein the portion of the selected gas is removed in step (ii) by a loss of pressure of the selected gas.

18. The method of claim 13, wherein the gas is selected from nitrogen, helium, oxygen, hydrogen, air, or combinations of two or more thereof.

* * * * *